No. 897,796. PATENTED SEPT. 1, 1908.
E. A. SPERRY.
PROCESS OF PREPARING MERCHANTABLE IRON AND TIN COMPOUNDS
FROM TIN PLATE SCRAP.
APPLICATION FILED OCT. 17, 1907.
4 SHEETS—SHEET 1.
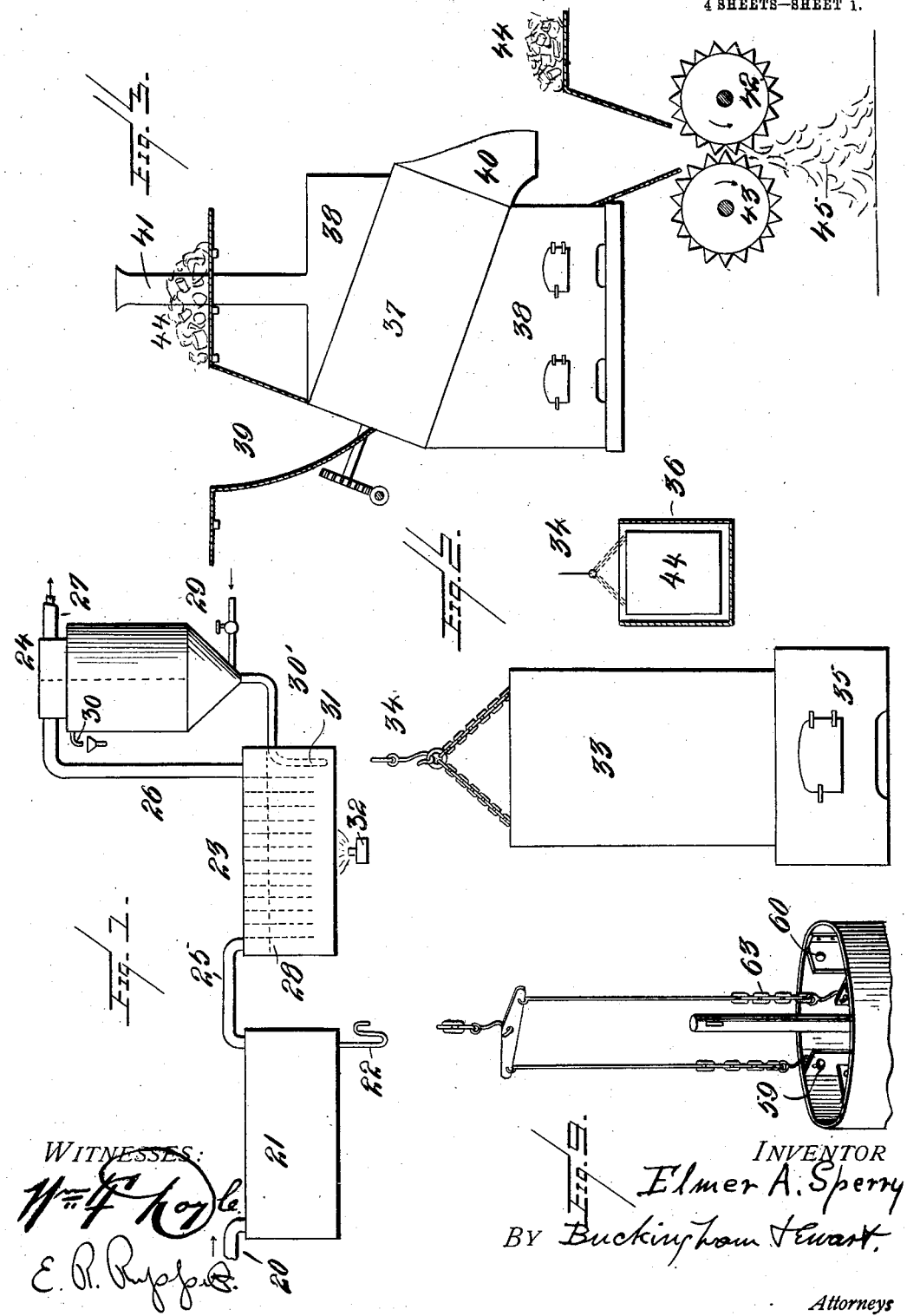
WITNESSES:
INVENTOR
Elmer A. Sperry
BY Buckingham Stewart
Attorneys

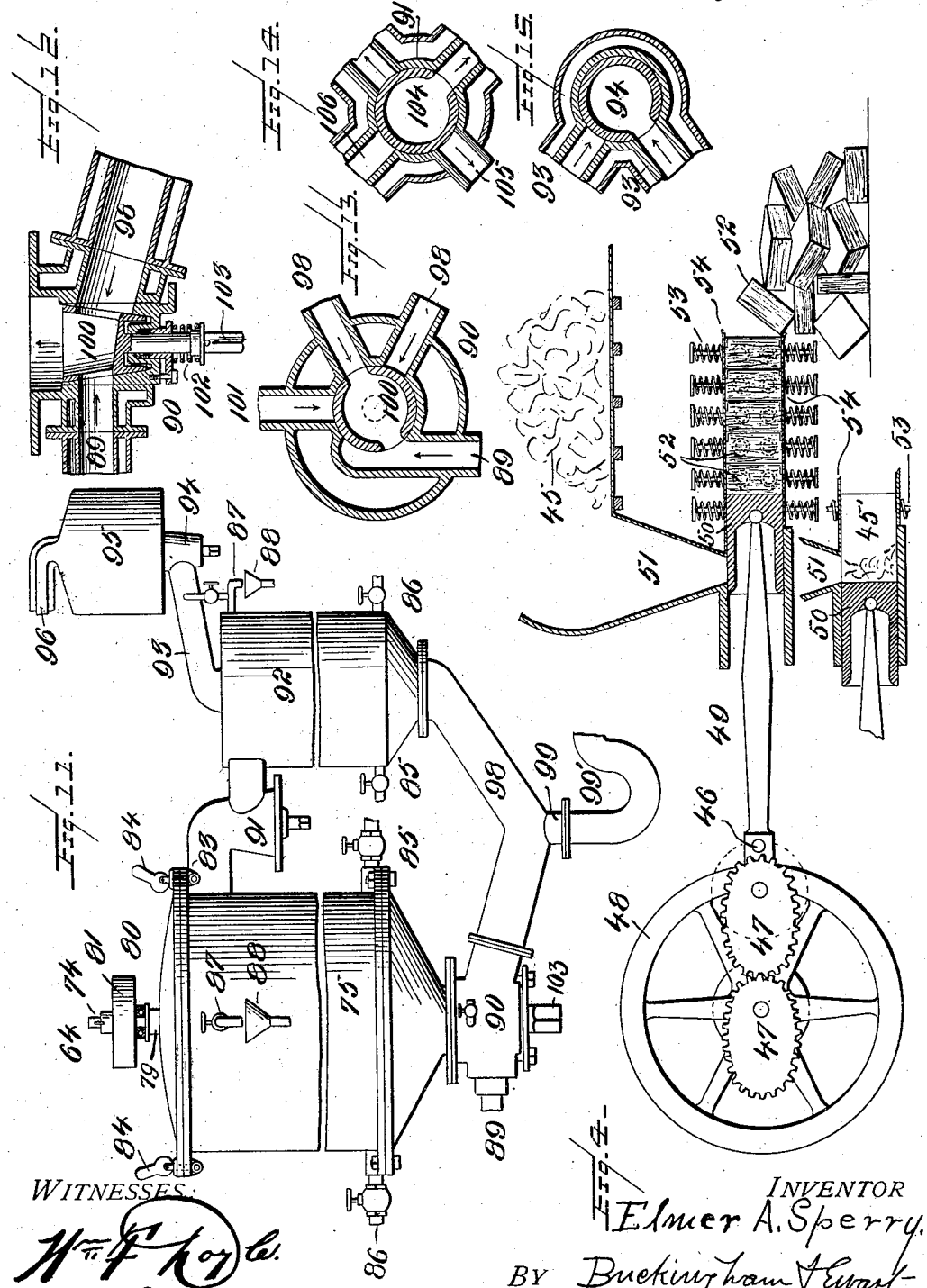

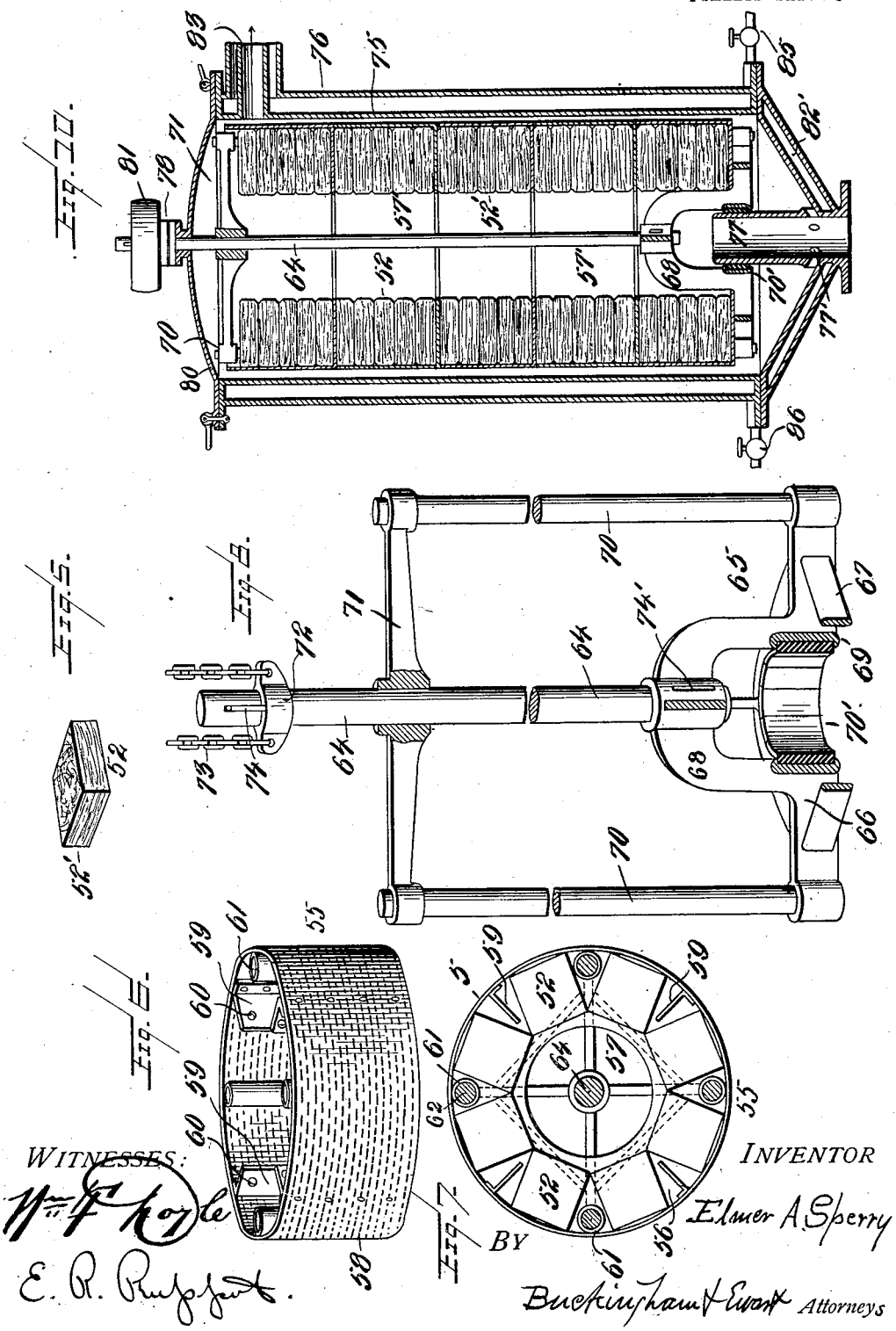

No. 897,796. PATENTED SEPT. 1, 1908.
E. A. SPERRY.
PROCESS OF PREPARING MERCHANTABLE IRON AND TIN COMPOUNDS
FROM TIN PLATE SCRAP.
APPLICATION FILED OCT. 17, 1907.
4 SHEETS—SHEET 4.
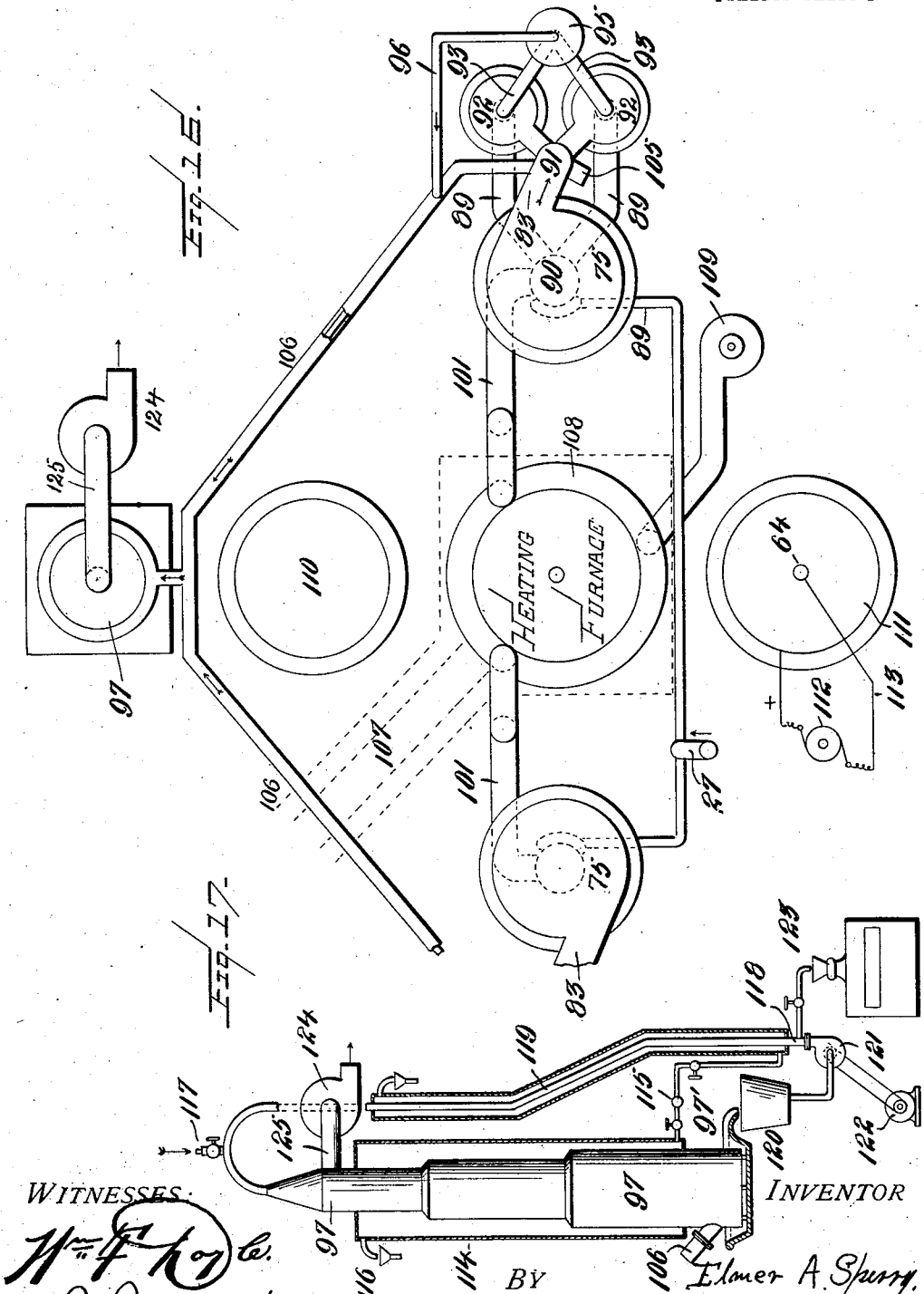

UNITED STATES PATENT OFFICE.

ELMER A. SPERRY, OF BROOKLYN, NEW YORK.

PROCESS OF PREPARING MERCHANTABLE IRON AND TIN COMPOUNDS FROM TIN-PLATE SCRAP.

No. 897,796.      Specification of Letters Patent.      Patented Sept. 1, 1908.

Application filed October 17, 1907. Serial No. 397,834.

*To all whom it may concern:*

Be it known that I, ELMER A. SPERRY, a citizen of the United States, residing at Brooklyn, in the county of Kings and State of New York, have invented new and useful Improvements in Processes of Preparing Merchantable Iron and Tin Compounds from Tin-Plate Scrap, of which the following is a specification.

This invention is based on the chemical reaction between chlorin and metallic tin which produces stannic chlorid. Tin or any tin bearing material, such for instance as tin plate scrap may be considered as suitable for the supply of the metal.

The invention consists in a process or method of operation whereby chlorin in any of its reacting forms, including anhydrous chlorin, gaseous chlorin, pure or diluted with moisture or other gases or vapors, or chlorin compounds may be successfully employed in carrying out the process economically, continuously and on a commercial basis. The stannic chlorid immediately resulting from the reaction may be considered as the terminal product, but the invention extends to steps for the treatment and purification of this material whereby the various commercial forms of the chlorid as well as other products are produced.

In producing halogen compounds of tin, and especially anhydrous compounds, it should be stated that a number of important facts and phenomena must be considered. Among these is the fact that the reaction between tin and any of the halogens is exothermic, developing far more heat than is usually understood; for instance, in treating tin with chlorin, there are about 2000 British thermal units developed per pound of tin treated. Furthermore, when these compounds are produced from tin bearing material, such as tin powder or tin scrap, it must be remembered that they all carry more or less moisture, which renders it impossible to produce the entire product in the anhydrous form; for instance, in producing anhydrous bi-chlorid of tin, moisture will instantly lock up more or less of this material in the ratio of from 8:1 to about 5 to 1; one of moisture will lock up about 8 and also 5 $Sn.Cl_4$, producing stannic chlorid hydrate which is a white solid at ordinary temperatures, melting at about 85 degrees centigrade. Bearing this in mind it is known that the tin scrap shipped in open cars when apparently dry, usually contains about 1% of moisture, and at the same time contains less than $2\frac{1}{2}\%$ of tin. The prior treatment and especially the careful drying of the tin bearing material or scrap before the reaction, becomes therefore extremely desirable.

Inasmuch as the present process, though not limited thereto, contemplates the use of moist chlorin and is enabled to produce 95% to 100% of tin product in the anhydrous form, the importance of the preparatory steps of both the reagent and the tin bearing material itself will at once become apparent.

When making the chlorin compounds from the tin scrap containing about $2\frac{1}{2}\%$ of tin, the heat generated is sufficient to raise the scrap as a whole, including the steel plate with specific heat of .1 to a very high temperature, unless the heat of the reaction is absorbed. Whereas dry chlorin or moist chlorin in the presence of anhydrous stannic chlorid does not attack steel, yet owing to the zone where the tin and steel are alloyed, the complete removal of the tin, which can only be accomplished by chlorin so far as known, leaves this zone in a spongy state with a great many minute particles of iron resting upon the surface of the black scrap, which are usually converted into halogen compounds of iron. In every instance these compounds are hydroscopic, and in most instances to the point of deliquescence, the resulting solutions breaking up into the oxid of iron and the acid radical which attacks more iron; the oxid thus gradually increases until finally the whole body of the steel has been converted into the oxid.

The invention further relates to the preparation of both the tin bearing material or tin scrap before it is reacted upon, and a prior treatment of the reagent itself for purposes of better fitting it for these reactions. The treatment of the scrap prior to detinning consists in part in cleansing the scrap from foreign substances, such as fats, oils, comestibles, and also from metals other than tin, including solder, antimony, etc., also the preparation of the tin scrap both prior to and after billeting, or compacting into bundles.

It further consists in cooling during reacting period or reacting under conditions of temperature control and also the peculiar preparation of the scrap when assembled into bundles which consists in making them up in layers or laminations, materially aiding in this manner the penetration of the detinning reagent; furthermore aiding such conditions of internal stress and pressure as are calculated to open up the interstices of the scrap to allow better penetration; heating the scrap to quite a high degree to dry same; treating the reagent and reacting upon same while hot, or before allowing the scrap to cool; reclaiming the tin bearing products either as liquid, solids, gases or vapors, and also in further treatment of the resulting black scrap, whereby it is first freed from the reagents or products of the reaction and afterward is rendered fit for the market, and also suitable for out-door storage or "weathering."

Other details are described in the specification illustrated in drawings and pointed out in the claims forming a part hereof.

Referring now to the accompanying drawings which are employed simply as illustrating one method of carrying out my invention and in which reference characters indicate similar parts throughout, Figure 1 is a diagrammatic representation of apparatus for the various steps in the treatment of the gaseous halogen reagent such as chlorin. Fig. 2 illustrates the saponification and washing apparatus. Fig. 3 the de-soldering furnace and mangling apparatus in diagram. Fig. 4 is a diagrammatic view of a billeting press. Fig. 5 illustrates one of the laminated billets. Figs. 6 and 7 are the details of the perforated cylindrical retainer. Fig. 8 is a detail showing the skeleton consisting of the shaft with its revolving part. Fig. 9 illustrates the method of handling one of the retainers. Fig. 10 is a view of the reaction chamber with the tin billets in place therein. Fig. 11 is an exterior view of the reaction vessel together with one of the condensers and the separator showing connections. Figs. 12 and 13 are sections of the lower valve. Fig. 14 shows a horizontal section of another valve. Fig. 15 shows a horizontal section of a valve between the two condensers and separator. Fig. 16 is a diagrammatic plan view of the arrangement of plant; and Fig. 17 is a partial section of the tower and scrubber showing the exhaust device, or fan, and circulating system connected with the tower.

A halogen reagent, such for instance as chlorin, preferably receives a suitable treatment prior to the detinning process proper, which may consist in refrigeration for elimination of moisture, the chlorin from the source of supply entering at 20, Fig. 1 and passing the refrigerator 21, the moisture escaping by trapped pipe 22. The chlorin from the refrigerator may pass to the system, or receive further pretreatment in vessel 23 acting alone or in conjunction with condenser 24, pipes 25 and 26 being used to connect these devices. From condenser 24 the gas enters the detinning apparatus by pipe 27. The vessel 23 contains a drying agent or moisture-absorbent 28, as for instance $SnCl_4$. The condenser 24 is cooled by cooling medium entering at 29 and discharging at 30. The excess drying agent expressed from the gas by condenser 24 is returned to the drying vessel 23 by pipe 30' and preferably under seal thereof, as shown at 31. The drying vessel 23 may or may not receive heat as from burner 32. The tin-bearing material or tin scrap also receives treatment prior to the detinning step proper, which may consist of the following steps. The scrap may be boiled in reservoir 33 (Fig. 2), the container carrying the scrap handled by crane 34. This vessel may or may not be heated by furnace 35. Reservoir 33 contains caustic alkali or a compound containing free alkali, and serves to saponify fat, filth and comestibles clinging to the scrap, and especially to old scrap. After saponification in vessel 33 the container is suitably washed and rinsed, as in vessel 36, from whence it may pass to the desoldering apparatus shown in Fig. 3. Here the scrap 44 is made to pass through a highly heated zone as in cylinder 37 within the furnace 38, provided with stack 41. The scrap may be fed by hopper 39 and issues through the eduction tube 40.

The scrap, either before or after being desoldered, preferably the latter, and either while hot or after being cooled, is passed through the mangling rolls 42 and 43, running in opposite directions and preferably at differential speeds. This serves to dismember, mangle or shred the scrap and prepare it more easily for the next step in the process, namely, the pressing, compacting or billeting, shown in Fig. 4. 44 indicates the scrap before shredding, and 45 after shredding. The shredded scrap 45 is then fed into a continuously acting press deriving its power from a suitably driven crank 46, either direct or through gears such for instance as the elliptical gears 47, 47, the driving gear being preferably connected with the fly-wheel 48. The crank 46 serves to operate a pitman 49 and plunger 50 which reciprocates so as to open the hopper 51 on its backward stroke and hold same closed on its forward stroke. When back, a small mass of the scrap 45' is thrown in front of the plunger 50 and added to the billet 52 successively, until same is completed, whereupon a septum, as for instance a sheet iron plate, is dropped into place to completely separate the billets. The resistance to the forward movement of the line of billets 52, 52, &c. is obtained through lateral pressure of the springs 53, 53 &c. which press upon one or more sides of the billet through the medium of flexible walls 54 of the rectangular tubular expansion in front of the ram or plunger 50, and from the far end of which the billets 52 gradually issue. It will be noticed that these billets are laminated flatwise through the successive additions of portions or layers 52′, 52′ &c. and also that the billets themselves are preferably rectangular and flat, as shown in Figs. 4, 5 and 10; but any shaped billet may of course be employed. The billets 52 are now introduced into the process proper, either direct or after undergoing further pre-treatment. When used, this pre-treatment consists in the steps presently to be explained.

Circular tubs or retainers 55 are provided with a floor 56 perforated with a large central opening 57 the periphery of which consists of perforated metal as shown in Fig. 6 and indicated at 58. Interior to this retainer are internal radial ribs 59 perforated at their upper ends at 60 and serving as handles to the retainers and guides for the billets 52 as indicated in Fig. 7. Intermediately disposed are tubular extensions 61 which register with four equidistant openings 62 in the floor of the retainer. Into this basket are placed billets 52 to the height of, say, five, one upon the other, 40 in all, and leaving a central space or opening 57′, the retainer as a whole being handled by a crane, as shown in Fig. 9 with the hooks 63 engaging the openings 60 in the plate 59. For reception of a number of these retainers, say five as is shown in Fig. 10, there is a framework consisting of a central shaft 64 provided at its lower extremity with a spider 65 consisting of radial arms 66 and braces 67 engaging the shaft 64 by webs 68, and serving to hold the ring 69 in which are located the graphite blocks 70′ serving as a chemically inert journal or guide for the lower end of this organization. At the extremity of each of the radial arms are the tubes or bars 70 serving as vertical guides for the retainers and coöperating with the openings 62 therein, the spider 71 at the top being removed while the retainers are being slipped upon the guides or tubes 70, by means of the crane device shown in Fig. 9. After the last basket is in position, the spider 71 is placed over the tops of the guides 70, thus fixing their upper ends with reference to the central shaft 64. Hanger 72 slips over the end of the shaft simply for the purpose of handling the group of retainers as a whole by chains 73 and key 74. A similar key 74′ is used at the bottom of the shaft for securing and hanging the spider 65. The assembled retainers being now secured to the shaft, it may be lowered into any one of the chambers provided for its reception, as for instance the chambers 110 and 111 where the scrap is washed, treated or dried, or in the central furnace where it is dried and heated, or the chamber 75, jacketed as shown at 76 Fig. 10, provided with a stationary upward projection of its bottom tube 77 perforated for draining at 77′, on the outside of which the graphite blocks 70′ impinge, acting in their capacity as guide and journal.

It should be remembered that the load is perfectly supported through the shaft 64, by the ball bearing 78 on the top of gland 79, forming a part of the cover 80 of the vessel. This ball thrust bearing may be plainly seen in Fig. 11 as being under the flanged pulley 81, the key 74 being now used as a driver between pulley 81 and the shaft 64. The organization is such that a small amount of power applied to pulley 81 will revolve the mass within the chamber 75. The ends as well as the sides of this retainer may be jacketed as indicated at 82′ at the bottom and an eduction passage is provided preferably at the top indicated by passage 83, and preferably also tangentially disposed as indicated in Fig. 16.

Referring now to Fig. 11, the exterior of the vessel 75 is shown with its eduction passage 83 and cover 80 attached as by quickly operating cams 84 operating in slots on the cover in the well-known manner. Means for heating this vessel are shown at 85, and for cooling the vessel shown at 86 and also 87 being a valved sight-discharge into funnel 88. The reagent reaches the vessel through the smaller pipe 89 and traverses jacketed valve 90, thence upwardly into the reaction vessel 75, out through another valve 91, preferably jacketed and connected to the discharge opening, each of these valves being piped to the respective ends of the cooler or condenser 92 which is also provided with heating means 85 and cooling means 86, and also with a similar valved sight-discharge apparatus 87 and 88. The condenser 92 is suitably jacketed as is preferably also the pipe 93 leading from its upper end and connecting with valve 94 and separator 95, the top of the separator being connected by jacketed discharge pipe 96 with the tower or scrubber 97. The passage 98, preferably jacketed, for temperature control, serves to connect valve 90 with the lower end of the condenser or cooler 92 and is provided with a discharge opening for liquids or products indicated at 99, trapped as shown at 99′.

The valve 90 is shown in section in Figs. 12 and 13, the upward discharge being connected simultaneously with the jacketed pipe 98 and also with the chlorin supply pipe 89, the flow of the gases being indicated by the arrows, the moving part of the valve 100 serving to connect the reaction chamber 75 with the various passages which are designated on the drawing. The condensers may be two in number, only one of which is connected with the reaction chamber at a time, but in each instance the chlorin connection 89 is uninterrupted. But both passages 98 and 89 are interrupted when the communication is made with the hot air passage 101.

The valve is suitably drawn and held to its seat as by springs 102 and operated by a stem 103. The valve 91 is indicated in section in Fig. 14, and its central chamber may be put in communication, one at a time, with any one of the four passages shown in said figure. Valve 94 serves to establish communication between the separator 95 and one or the other of the condensers 92 by pipes 93 93, or its revolving part may be so turned as to stop off all communication with either of the condensers.

Fig. 16 gives a diagrammatic view of the general arrangement of plant, showing the various connecting passages. The plant at the right of the furnace being similar to the one at the left, it only will be described. The reaction chamber 75 is here seen to be connected with the chlorin induction pipe 89, and also with the condensers 92 92 by pipes 98 98 at the bottom and also through the valve 91 at the top, the passage for the hot air 101 being shown as communicating with the valve 90 underneath, and the opening of the valve 91 to the outer air being indicated by 105, and to the tower 97 by pipes 106 with branch pipe 96 connecting it with the separator 95. At the top of the condensers the pipes 93 are also indicated. A heating furnace so marked is provided at the center of the plant with the flue 107. The jacket around the heating furnace indicated at 108 serves to supply heated air to pipes 101, the air being impelled in any suitable manner, as by a fan or blower 109, these pipes leading preferably to valves 90 below each of the reaction chambers 75.

At right angles to the furnace are two jacketed cylinders 110 and 111 respectively. In the upper one on the drawing, the billeted scrap after being mounted upon the shaft 64, is lowered, and treated in any suitable manner, for instance washing, to prepare it for the next step in order, which is raising to a high temperature in the furnace, whereupon and preferably while still heated, it goes into either one or the other of the treating vessels 75, where it may be still further treated by heated air by the proper manipulation of valves 90 and 91, while under conditions of rotation and corresponding centrifugal stress which being applied as it is substantially parallel to and in line with the laminæ 52, tends to open same and thus open up the bundles of scrap for better penetration of the liquids or gases,—and, in fine, the special treatment to which the scrap is being subjected at the time; this centrifugal stress may also be applied in the pretreating vessel 110 and also in the furnace so marked. In addition to this centrifugal stress, the scrap may be heated and cooled, which in and of itself tends to open up the interstices of compacted scrap to a remarkable degree. It has been found with the apparatus illustrated herein, with the baskets 60 inches in diameter, with a comparatively low rotative speed, pressures exceeding 100 pounds per square inch can be developed within the billets of scrap, and being unidirectional in its application and especially practically in line with the layers, opens up the interior of the masses to a remarkable degree for quick penetration of the reagent, menstruum or other active agent as stated. After the reaction is completed, the scrap is then heated to a high degree and may be then or afterward air-washed with heated air, all under conditions of centrifugal stress or change in centrifugal stress, for removing the last trace of both the reagent and the product. The remaining black scrap now goes to a suitable chamber 111 after the reaction and the separating treatment above described in the reaction vessel 75. Here it is washed free of any remnant of the reagent or products, and treated with a suitable non-rusting material, or compound, such for instance as caustic alkali.

The scrap may receive such other treatment as will aid in still further improving its merchantable and weathering qualities, these being described and claimed in my co-pending application Serial No. 420,946, March 13th 1908.

The tower 97 as indicated in Fig. 17 may be provided with a jacket 114 which may be furnished with a cooling medium from pipe 115, and which overflows at 116. A suitable solvent which, for instance, may be water, is introduced through pipe 117 and may join the effluent at point 118, or jacketed pipe 119 permits of continuous circulation upward from pump 121, and downward through the tower, out at the discharge nozzle 97', through the separator or dechlorinizing apparatus 120—which for instance may contain metallic tin—the circulation being maintained by pump 121 driven from suitable motor 122. The product is drawn from the system at 123, the gas or vapor main 106 being indicated at the bottom of the tower; and a gas or vapor exhausting device indicated at 124 connected with the tower by passage 125. (Figs. 16 and 17).

The use and operation of this apparatus will be readily understood from the foregoing description. It may here be pointed out that the tin bearing material, for instance the tin scrap, after having gone through such preparation as is necessary is treated in the reaction vessel 75 preferably under conditions of centrifugal stress by the rotation of the assembled retainers upon the axis 64, the perforated cylindrical walls of the retainers and radially exposed billets of scrap, together with the radial plates 59 and also the radial webs 68, all acting in conjunction with the large central opening 57' produce a definite fan action and throws the gases vigorously toward the outer wall of the vessel 75 the gases and vapors passing ultimately through the tangentially disposed discharge opening 83, thence downwardly through the condenser or cooling chamber 92 out through its bottom and reëntering the reaction chamber 75 through the lower valve 90 and upwardly to projecting tube 77. The reagent proper, usually in the form of gas, for instance chlorin, enters the system at the bottom through the smaller pipe 89 and is introduced only as required. At the time that the reaction is going forward the temperature of the surrounding jacket of the reaction vessel 75 may be manipulated as required, it may be raised and lowered, or a cooling medium may be constantly circulated through the chamber in this way acting in conjunction with the cooler 92 to absorb the heat of the reaction inasmuch as it will be seen that the gases and vapors pass rapidly upward through the reaction chamber and downward through the cooler, thus facilitating the rapidity of the reaction without overheating. It will be understood that if the reagent is diluted with air the air will be saturated at the temperature with the stannic vapors, it therefore becomes necessary to provide means for dissolving or absorbing or otherwise reclaiming the values of these vapors. Inasmuch as the direct product in liquid form is desired, as little should be allowed to escape or be carried away with these vapors as possible. The separator 95 is provided whereby the velocity of the gases is slowed down and the vapors and liquids entrained or otherwise carried are separated and reclaimed as far as possible, the escaping vapors then pass to the scrubber which may operate in any well-known manner, but I prefer to here use a circulating system by means of which the stannic solutions are rapidly circulated and whereby they may become strengthened to any desired degree, also whereby they may be cooled and thus rendered more absorbent and furthermore at a predetermined point in the circulation may be so treated as to remove excess of any given element or compound tending to render the product less desirable for use in the arts. For instance, excess of dissolved chlorin may be removed from the stannic chlorid solution by passing the solution over metallic tin contained in the receptacle 120, the jackets both of the tower and the circulating pipe being for purposes of temperature control, as will be readily understood. The condensed product from both the reaction chamber 75 and the cooler 92 is discharged through any convenient opening, as for instance the trapped pipe 99'. It will thus be seen that the tin bearing products may be in more than one form any one of which may be used for instance, the products are in three forms, viz: anhydrous stannic chlorid, stannic chlorid solutions discharged from the tower and hydrated stannic chlorid these latter usually in very small quantities discharged from the cooler 92, where it is gathered upon the walls or pipes and is suitably removed from the cooler as by melting, by supplying steam or other heating means through the jacket from source 85 in lieu of the cooling water normally used therein.

It will be readily understood that the scrap treated by this process need not be billeted, but when so billeted it is possible to develop in a 60" retainer a pressure of over 100 lbs. per square inch on the interior of the billets by a comparatively slow rotative speed of the retainer about the shaft 64. This organization requires practically no power except for overcoming the inertia, inasmuch as the whole load is borne by the ball bearings seen in Fig. 11 below pulley 81. It will further be noticed that the centrifugal stress thus developed is unilinear in direction and is at right angles to the line of the thickness of the billets and also at right angles to the line of pressure applied in the compacting of the billets, and furthermore in line with the laminations 52' within the billets, whereby the interstices of the compacted scrap are opened up vigorously for the entrance of the reagent, removal of the product; for the heating both before and after the reaction, for the drying off of the product and for the impregnation of the mass by the alkali and electrolytically developed hydrogen for the protection of the black scrap as described in my application referred to above.

The preliminary treatment of both the reagent and the tin scrap has been variously described by me in this art and need not further be pointed out here, except to mention that the tin scrap, especially old tin scrap, should be dismembered and mangled or shredded, not only for purposes of better attack by the reagent, but for purposes of constructing billets or bundles which will more readily cohere and not readily disintegrate under the conditions of being compiled in layers or by separately added portions.

It has been definitely ascertained that the penetration of the reagent into the interstices of the billets or bundles is facilitated by compacting the scrap therein in the form of layers or laminations, there being a definite tendency to hasten the process, resulting, it is believed—from the fact that main channels which run straight into the heart of the billet are opened up by the progressive action of the chlorin dissolving the tin as it advances, aided, or not as the case may be, by the action of heat and pressure or changes of heat and pressure. From these main channels the chlorin is found to spread laterally through the comparatively thin masses forming the layers from each side thereof very quickly, requiring far less time than it does when it is required to come in from the lateral faces of the bundle as a whole.

Having pointed out the essential features of my process or method of producing halogen compounds of tin, I may state that the process should not in any way be limited to the exact details of the method or apparatus described herein with reference to any particular step or indeed the exact order of the steps, which are simply given as illustrating one method of carrying my process into effect. It should be mentioned that this process may be varied in some of its parts to suit the special form of tin bearing material or the pecularity of the reagent itself, thus the process should be suited to the changes in characteristics of both elements, and in this instance steps may be altered or omitted and others may be employed, and the invention extends to such use.

I claim:

1. The process of detinning and preparing merchantable iron from tin plate scrap which consists in billeting the scrap, packing the billets into retainers around a central space, placing the retainers within a chamber provided with a central induction and a peripheral eduction opening and developing a fluid current of the detinning reagent from the central space outwardly through the scrap rotating the retainer, and separately recovering the resulting black scrap and the tin bearing products.

2. The process of detinning and preparing merchantable iron from tin plate scrap which consists in billeting the scrap, packing the billets into retainers around a central space, placing the retainer within a chamber provided with a central induction and a peripheral eduction opening, propelling a gaseous current of the detinning reagent through the chamber by centrifugal action due to rotating the retainer, and separately recovering the resulting black scrap and the tin bearing products.

3. The process of detinning and preparing merchantable iron from tin plate scrap which consists in billeting the scrap, packing the billets into retainers, heating the group of billets thus packed under the combined condition of flow of the gaseous detinning reagent through the scrap and centrifugal action, and separately recovering the resulting black scrap and the tin bearing products.

4. The process of preparing merchantable iron from tin plate scrap which consists in suitably preparing the scrap, placing same in a reaction vessel, subjecting such scrap to a detinning reagent, and varying pressure on such scrap while holding the vessel at subatmospheric pressure during de-tinning.

5. The process of detinning and preparing merchantable iron from tin plate scrap which consists in compressing the scrap into laminated billets, packing such billets to form a cylinder with the laminations in a plane normal to the axis, suitably preparing the scrap so packed forcing the detinning reagent through the scrap in line with the laminations and separately recovering the resulting black scrap and the tin bearing products.

6. The process of detinning and preparing merchantable iron from tin plate scrap which consists in compressing the scrap into flat billets, packing the billets flatwise into a cylindrical retainer, the plane of the billets being normal to the axis forcing the detinning reagent through the scrap in line with the plane of the billets, and separately recovering the resulting black scrap and the tin bearing products.

7. The process of detinning and preparing merchantable iron from tin plate scrap which consists in compressing the scrap into laminated billets, packing such billets within a cylindrical retainer with the laminations in a plane normal to the axis forcing the detinning reagent through the scrap in line with the laminations, and separately recovering the resulting black scrap and the tin bearing products.

8. The process of preparing merchantable iron from tin plate scrap which consists in suitably billeting the scrap, placing same within a reaction vessel, subjecting such scrap to a de-tinning reagent and varying the pressure on such scrap by raising and lowering same while holding the vessel at subatmospheric pressure during de-tinning.

9. The process of preparing merchantable iron from tin plate scrap which consists in suitably bundling the scrap in laminated billets, placing same within a reaction vessel, subjecting such scrap to a de-tinning reagent, varying the pressure on such scrap, the said pressure being substantially in line with the laminations and independent of the pressure within the vessel during de-tinning.

10. The process of preparing merchantable iron from tin plate scrap which consists in subjecting compressed scrap to the action of a de-tinning reagent and forcing the reagent into the interstices of the scrap by opening up the mass by applying unilinear pressure to such scrap during de-tinning.

11. The process of preparing merchantable iron from tin plate scrap which consists in subjecting compressed scrap in laminated billets to the action of a de-tinning reagent and forcing the reagent into the interstices of the scrap by opening up the mass by pressure applied substantially in line with the laminations during de-tinning.

12. The process of preparing merchantable iron from tin plate scrap which consists in subjecting compressed scrap in laminated billets to the action of a de-tinning reagent and forcing the reagent into the interstices of the scrap by opening up the mass by centrifugal pressure applied substantially in line with the laminations.

13. The process of preparing merchantable iron from tin plate scrap which consists in subjecting compressed scrap to the action of a de-tinning reagent and forcing the reagent into the interstices of the scrap by opening up the mass by pressure and varying the temperature during de-tinning.

14. The process of preparing merchantable iron from tin plate scrap which consists in subjecting scrap to the action of a de-tinning reagent and forcing the reagent into the interstices of the scrap by placing the scrap under the action of a rapidly flowing stream of gaseous fluid during de-tinning.

15. The process of preparing merchantable iron from tin plate scrap which consists in subjecting scrap to the action of a de-tinning reagent and forcing the reagent into the interstices of the scrap by placing the scrap under the action of a rapidly flowing stream of cooled gaseous fluid during de-tinning.

16. The process of preparing merchantable iron from tin plate scrap which consists in subjecting scrap to the action of a de-tinning reagent and forcing the reagent into the interstices of the scrap by placing the scrap under the repeated action of a stream of fluid circulating in a closed circuit during de-tinning.

17. The process of preparing merchantable iron from tin plate scrap which consists in subjecting scrap to the action of a de-tinning reagent and forcing the reagent into the interstices of the scrap by placing the scrap under the repeated action of an extraneously cooled stream of fluid circulating in a closed circuit during detinning.

18. The process of preparing merchantable iron from tin plate scrap which consists in subjecting scrap to the action of a de-tinning reagent and forcing the reagent into the interstices of the scrap by placing the scrap under the action of a mechanically moved stream of fluid propelled by centrifugal action during de-tinning.

19. The process of preparing merchantable iron from tin plate scrap which consists in subjecting scrap to the action of a de-tinning reagent and forcing the reagent into the interstices of the scrap by placing the scrap under the action of a rapidly flowing stream of fluid, cooling and condensing the vapors from such stream during de-tinning and returning the stream to the masses of scrap.

20. The process of preparing merchantable iron from tin plate scrap which consists in placing compacted scrap in a retainer, placing the retainer within a reaction chamber having a suitable induction and eduction opening, subjecting the scrap to the action of a de-tinning reagent and forcing the reagent into the interstices of the scrap by a current of fluid caused to circulate within the chamber by the centrifugal action set up by rotating the scrap during de-tinning.

21. The process of preparing merchantable iron from tin plate scrap which consists in placing compacted scrap in a retainer, placing the retainer within a reaction chamber provided with means for temperature control, subjecting the scrap to the action of a de-tinning reagent and forcing the reagent into the interstices of the scrap by a current of fluid caused to circulate within the chamber by the centrifugal action set up by rotating the scrap and the retainer during de-tinning.

22. The process of preparing merchantable iron from tin plate scrap which consists in placing compacted scrap in a retainer, placing the retainer within a cooled reaction chamber, subjecting the scrap to the action of a detinning reagent and forcing the reagent into the interstices of the scrap by a current of fluid caused to circulate within the chamber by the centrifugal action set up by rotating the scrap and the retainer during de-tinning.

23. The process of preparing merchantable iron from tin plate scrap which consists in placing compacted scrap in a retainer, placing the retainer within a cooled reaction chamber having a suitable induction and eduction opening, subjecting the scrap to the action of a de-tinning reagent forcing the reagent into the interstices of the scrap by a current of fluid caused to circulate in a path which is partially within the chamber and partially without such chamber by the centrifugal action set up by rotating the scrap and the retainer during de-tinning and controlling the temperature of the said current outside of the reaction chamber.

24. The process of preparing merchantable iron from tin plate scrap which consists in placing compacted scrap in a retainer, placing the retainer within a reaction chamber having a suitable induction and eduction opening, subjecting the scrap to the action of a de-tinning reagent forcing the reagent into the interstices of the scrap by a current of fluid caused to circulate in a path which is partially within the chamber and partially without such chamber by the centrifugal action set up by rotating the scrap and the retainer during de-tinning and cooling the said current exterior to the re-action chamber.

25. The process of preparing merchantable iron from tin plate scrap which consists in placing compacted scrap in a retainer, placing the retainer within a reaction chamber, subjecting the scrap to the action of a de-tinning reagent forcing the reagent into the interstices of the scrap by a current of fluid caused to circulate within the chamber by the centrifugal action set up by rotating the scrap and the retainer during de-tinning, and removing the product from the chamber and dissolving the gases from the plant.

26. The process of preparing merchantable iron from tin plate scrap which consists in placing compacted scrap in a retainer, placing the retainer within a reaction chamber, subjecting the scrap to the action of a de-tinning reagent forcing the reagent into the interstices of the scrap by a current of fluid caused to circulate within the chamber by the centrifugal action set up by rotating the scrap and the retainer during de-tinning, and removing the product in both gaseous and liquid form from the chamber.

27. The process of preparing merchantable iron from tin plate scrap which consists in placing compacted scrap in a retainer, placing the retainer within a reaction chamber, subjecting the scrap to the action of a de-tinning reagent forcing the reagent into the interstices of the scrap by a current of fluid caused to circulate within the chamber by the centrifugal action set up by rotating the scrap and the retainer during de-tinning, and removing the gaseous product from the upper part and the liquid product from the lower part of the chamber.

28. The process of preparing merchantable iron from tin plate scrap which consists in placing compacted scrap within a reaction chamber, treating same with chlorin, circulating the chlorin together with the vapors arising from reaction in a closed circuit, leaving and reëntering the said chamber, separating the gas and vapor outside of such circuit and in the path of the eduction flow of the gases from the plant.

29. The process of preparing merchantable iron from tin plate scrap which consists in placing compacted scrap within a reaction chamber, treating same with chlorin, circulating the chlorin together with the vapors arising from reaction in a closed circuit, leaving and reëntering the said chamber, separating the gas and vapor outside of such circuit in the path of the heated eduction flow of the gases and dissolving the eduction vapors in whole or part.

30. The process of preparing merchantable iron from tin plate scrap which consists in placing compacted scrap in a reaction chamber, treating same with chlorin, circulating the chlorin together with the vapors arising from reaction in a closed circuit, leaving said chamber above and reëntering the chamber below the reacting mass.

31. The process of preparing merchantable iron from tin plate scrap which consists in placing compacted scrap in a reaction chamber, treating same with chlorin, circulating the chlorin together with the vapors arising from reaction in a closed circuit, leaving and reëntering the said chamber, the flow being upward through the chamber, and removing the liquids from the circuit outside the chamber.

32. The process of preparing merchantable iron from tin plate scrap which consists in placing compacted scrap in a chamber, treating same with chlorin, circulating the chlorin together with the vapors arising from reaction in a closed circuit, leaving and reëntering the said chamber, the flow being upward through the chamber, and removing the liquids from the circuit through a liquid seal outside the chamber.

33. The process of preparing merchantable iron from tin plate scrap which consists in re-acting upon the scrap with a suitable reagent for removing the tin within a reaction chamber under conditions of reduced pressure within such chamber and treating the vapors arising from the reaction with a circulating solvent.

34. The process of preparing merchantable iron from tin plate scrap which consists in reacting upon the scrap with a suitable reagent for removing the tin within a reaction chamber under conditions of reduced pressure within such chamber treating the vapors arising from the reaction with a suitable circulating solvent and removing chlorin from such circulating solvent.

35. The process of preparing merchantable iron from tin plate scrap which consists in reacting upon the scrap with a suitable reagent for removing the tin within a reaction chamber under conditions of reduced pressure within such chamber and treating the vapors arising from the reaction with a suitable artificially cooled solvent.

36. The process of preparing merchantable iron from tin plate scrap, which consists in placing the scrap in a reaction chamber, treating same with chlorin, circulating the chlorin together with the vapors arising from reaction, vigorously within the chamber and also in a closed circuit, leaving and reëntering the said chamber, and removing the liquids from the circuit outside the chamber.

37. The process of preparing merchantable iron from tin plate scrap which consists in placing the scrap in a reaction chamber, treating same with chlorin, circulating the chlorin together with the vapors arising from reaction, vigorously within the chamber and also in a closed circuit, leaving and reëntering the said chamber, cooling the gases and vapors and removing the liquids from the circuit outside the chamber.

38. The process of preparing merchantable iron from tin plate scrap which consists in bundling or billeting the scrap in layers or laminations for purposes of aiding the penetration of the detinning reagent into the interstices of the scrap so bundled.

39. The process of preparing merchantable iron from tin plate scrap which consists in bundling or billeting the scrap in layers or laminations for purposes of aiding the penetration of the detinning reagent into the interstices of the scrap so bundled, and varying the pressure upon such bundles for still further aiding the said penetration of the reagent during detinning.

40. The process of preparing merchantable iron from tin plate scrap which consists in bundling or billeting the scrap in layers or laminations for purposes of aiding the penetration of the detinning reagent into the interstices of the scrap so bundled, and varying the pressure upon and temperature of such bundles for still further aiding the said penetration of the reagent during detinning.

In testimony whereof I have hereunto set my hand in presence of two subscribing witnesses.

ELMER A. SPERRY.

Witnesses:
W. H. MUMSEN,
A. H. McKINLAY.